United States Patent
Suzuki et al.

(10) Patent No.: US 7,483,647 B2
(45) Date of Patent: Jan. 27, 2009

(54) CARTRIDGE HAVING A MOLDED RESIN COMPLEX

(75) Inventors: Akira Suzuki, Naka-gun (JP); Osamu Anan, Susono (JP); Jun Miyamoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 11/615,204

(22) Filed: Dec. 22, 2006

(65) Prior Publication Data

US 2007/0147879 A1 Jun. 28, 2007

(30) Foreign Application Priority Data

Dec. 27, 2005 (JP) ............................. 2005-374587

(51) Int. Cl.
*G03G 15/06* (2006.01)
(52) U.S. Cl. ...................... 399/102; 399/111; 399/103; 399/105; 399/106
(58) Field of Classification Search ................ 399/102, 399/103, 104, 105, 106, 111; 219/121
See application file for complete search history.

(56) References Cited

U.S. PATENT DOCUMENTS

| | | | | |
|---|---|---|---|---|
| 4,636,609 | A * | 1/1987 | Nakamata | 219/121.64 |
| 6,118,957 | A * | 9/2000 | Fujiwara et al. | 399/103 |
| 6,501,924 | B2 * | 12/2002 | Nagashima | 399/106 |
| 6,834,171 | B2 | 12/2004 | Nittani et al. | |
| 6,993,267 | B2 * | 1/2006 | Yoshiyuki et al. | 399/114 |
| 2003/0088076 | A1 * | 5/2003 | Koshida et al. | 534/653 |
| 2003/0125429 | A1 * | 7/2003 | Joachimi et al. | 524/105 |
| 2005/0003161 | A1 | 1/2005 | Abe et al. | 428/162 |
| 2005/0119377 | A1 * | 6/2005 | Ishii et al. | 524/88 |
| 2006/0048521 | A1 * | 3/2006 | Katayama et al. | 62/6 |

FOREIGN PATENT DOCUMENTS

JP 2003-241495 8/2003

* cited by examiner

*Primary Examiner*—David M Gray
*Assistant Examiner*—G. M. Hyder
(74) *Attorney, Agent, or Firm*—Fitzpatrick, Cella, Harper & Scinto

(57) ABSTRACT

A cartridge mounted on an electrophotographic image forming apparatus includes a molded resin complex in which a first resin molded product and a second resin molded product are engaged with each other so as to be separable. The first resin molded product is obtained by molding a first resin pervious to laser light, and the second resin molded product is obtained by molding a second resin absorptive to laser light. The first resin molded product and the second resin molded product are engaged with each other so as to be separable, by one or more protrusions of the second resin molded product which is formed by applying laser light from the first resin molded product side while placing the first resin molded product and the second resin molded product either in a close state or in a contact state. The cartridge further includes a developer containing frame containing a developer and a handle for drawing out a sealing member sealing a developer supplying opening of the developer containing frame, in which the first resin molded product is the handle, and the second resin molded product is the developer containing frame.

5 Claims, 6 Drawing Sheets

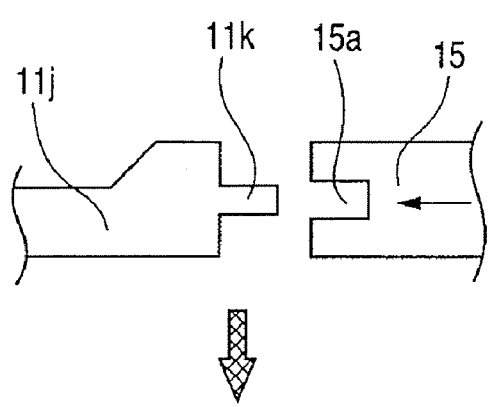
FIG. 7A
FIG. 7B
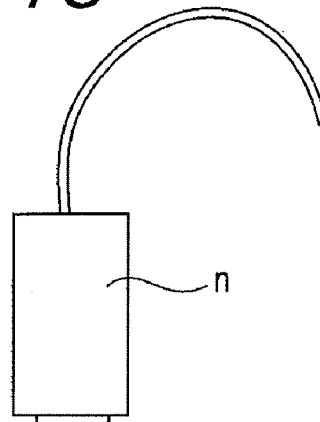
FIG. 7C
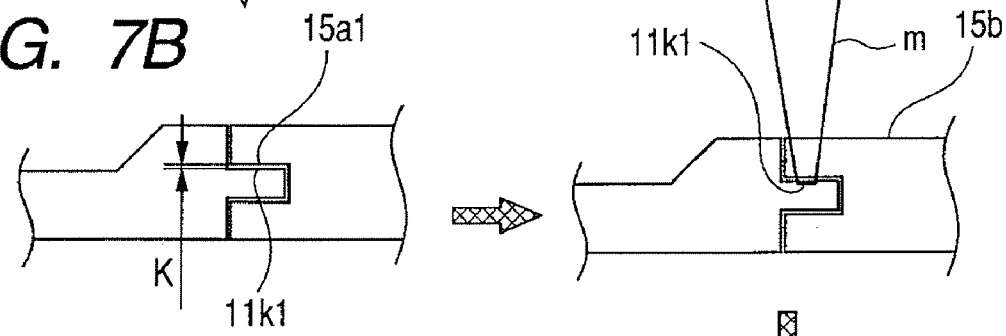
FIG. 7D
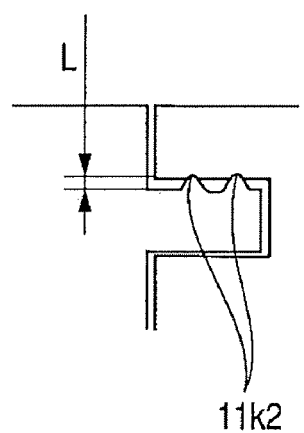
FIG. 7E

CARTRIDGE HAVING A MOLDED RESIN COMPLEX

BACKGROUND OF THE INVENTION

1. Field of the Invention

The present invention relates to a molded resin complex constituting a cartridge attachable/detachable to a body of an electrophotographic image forming apparatus that adopts an electrophotographic system such as a laser printer and a copier, and a method of producing the molded resin complex. Specifically, the present invention relates to a molded resin complex in which resin molded products having low compatibility with each other are engaged so as to be separable using irradiation with laser light, and a method of producing the molded resin complex.

Herein, the electrophotographic image forming apparatus forms an image on a recording medium using an electrophotographic image forming system. Examples of the electrophotographic image forming apparatus include an electrophotographic copier, an electrophotographic printer (e.g., a laser beam printer, an LED printer, etc.), a facsimile apparatus, and a word processor.

2. Description of the Related Art

Conventionally, in an image forming apparatus using an electrophotographic image forming process, a process cartridge system is adopted. In the process cartridge system, a cartridge in which an electrophotographic photosensitive member, process means acting on the electrophotographic photosensitive member, a developing device, etc. are integrated with one another, can be attached/detached to an image forming apparatus body. According to the process cartridge system, a user can perform maintenance of an apparatus without relying upon a serviceman, so the operability can be enhanced remarkably. Thus, the process cartridge system is used widely in an image forming apparatus.

In the process cartridge, a developer container (toner container) containing a developer (toner) is connected to a developing container holding a developer carrying member (developer roller), a developer regulating member (developing blade), and so forth. It is proposed that an opening of the toner container for supplying toner to the developing container is sealed with a sealing member (toner seal) so that toner does not flow to the developing container until the commencement of use. A user pulls a sealing handle (pull-tab) attached to the process cartridge at the commencement of use to remove the toner seal fixed to the sealing handle, and then, attaches the process cartridge to the image forming apparatus body. The sealing handle is engaged with the toner container, the developing container, a bearing member or a side cover of the process cartridge so that the sealing handle does not come off easily due to vibrations or shocks during transportation or the like.

As the sealing handle, one has been known which is made of a material having low compatibility with the toner container, the developing container, the bearing member, or the side cover, and is integrally molded so as to be separable using a two-color molding method (JP-A-2003-241495).

The two-color molding method of engaging two resin molded products so as to be separable, as described in Japanese Patent Application Laid-Open No. 2003-241495, is a method of providing bonding force owing to the molding contraction of resin, and has the following problems.

(1) A flow path for a resin to be injected later is required to be formed by moving a mold piece which is used for forming part of a resin molded product to be molded first, which restricts the shape of an engagement portion.

(2) The bonding force (stress) is weakened due to a change in environmental temperature, with the result that the resin molded products may separate. In order to address such a problem, if an under-cut portion (portion having a shape preventing pull-out) is formed in the engagement portion, determining the mold pulling direction, which further restricts the shape of the engagement portion.

(3) The structure of the mold and the resin injection flow path become complicated, which increases mold costs.

(4) A molding machine exclusive to two-color molding is necessary.

On the other hand, as a method of engaging two resin molded products so as to be separable, a method of mechanically producing under-cuts such as snap-fit and thermal caulking can also be conceived. However, this method has the following problems.

(1) In a case of using a material (glass, etc.) having high elasticity in the snap-fit, the material itself is not deformed, so that the engagement portion may be deformed and damaged.

(2) It is necessary to form unevenness in consideration of the mold pulling direction in the snap-fit and thermal caulking, which restricts the mold structure.

(3) It is necessary to melt and cool the resin integrated in the thermal caulking, which takes a long time for engagement and entails assembly costs.

Accordingly, an object of the present invention is to reduce restrictions on a product design, a mold, and production facilities (molding machine) in the case of engaging two resin molded products so as to be separable, to reduce production costs, and further, to prevent the external appearance of the resulting molded resin complex and cartridge from being impaired.

The foregoing objectives can be achieved by the invention described below.

SUMMARY OF THE INVENTION

A first aspect of the present invention is a molded resin complex including a first resin molded product and a second resin molded product engaged with each other so as to be separable, wherein the first resin molded product is obtained by molding a first resin pervious to laser light; the second resin molded product is obtained by molding a second resin absorptive to laser light; and the first resin molded product and the second resin molded product are engaged with each other so as to be separable, by one or more protrusions of the second resin molded product which are formed by applying laser light from the first resin molded product side while placing the first resin molded product and the second resin molded product either in a close state or in a contact state.

A second aspect of the present invention is the molded resin complex according to the first aspect, wherein a difference in SP (Solubility Parameter) value between the first resin and the second resin is 0.2 or more.

A third aspect of the present invention is the molded resin complex according to the first aspect, wherein one of the first resin molded product and the second resin molded product is fitted with the other.

A fourth aspect of the present invention is the molded resin complex according to the first aspect, wherein the first resin molded product and the second resin molded product are either in a state that they are close to each other at an interval of 0.3 mm or less or in a state that they are in contact with each other.

A fifth aspect of the present invention is the molded resin complex according to the first aspect, wherein a molding temperature of the first resin is lower than a molding temperature of the second resin.

A sixth aspect of the present invention is a method for producing the molded resin complex according to any one of the first to fifth aspects, which includes applying laser light from the first resin molded product side while placing the first resin molded product and the second resin molded product either in a close state or in a contact state.

A seventh aspect of the present invention is a cartridge mounted on an electrophotographic image forming apparatus, including a molded resin complex in which a first resin molded product and a second resin molded product are engaged with each other so as to be separable, wherein the first resin molded product is obtained by molding a first resin pervious to laser light; the second resin molded product is obtained by molding a second resin absorptive to laser light; and the first resin molded product and the second resin molded product are engaged with each other so as to be separable, by one or more protrusions of the second resin molded product which are formed by applying laser light from the first resin molded product side while placing the first resin molded product and the second resin molded product either in a close state or in a contact state.

An eighth aspect of the present invention is the cartridge according to the seventh aspect, wherein a difference in SP value between the first resin and the second resin is 0.2 or more.

A ninth aspect of the present invention is the cartridge according to the seventh aspect, wherein one of the first resin molded product and the second resin molded product constituting the molded resin complex is fitted with the other.

A tenth aspect of the present invention is the cartridge according to the seventh aspect, wherein the first resin molded product and the second resin molded product are either in a state that they are close to each other at an interval of 0.3 mm or less or in a state that they are in contact with each other.

An eleventh aspect of the present invention is the cartridge according to the seventh aspect, wherein a molding temperature of the first resin is lower than a molding temperature of the second resin.

A twelfth aspect of the present invention is the cartridge according to the seventh aspect, which includes a developer containing frame containing a developer and a handle for drawing out a sealing member sealing a developer supplying opening of the developer containing frame, wherein the first resin molded product is the handle, and the second resin molded product is the developer containing frame.

A thirteenth aspect of the present invention is a method for producing the cartridge according to any one of the seventh to twelfth aspect, wherein the first resin molded product and the second resin molded product are placed either in a close state or in a contact state, and laser light is applied from the first resin molded product side.

According to the present invention, two resin molded products can be engaged with each other so as to be separable with improved latitude on product design, a mold and production facilities (molding machine), and reduced production costs, and without impairing the external appearance of the resulting molded resin complex and cartridge.

Further features of the present invention will become apparent from the following description of exemplary embodiments with reference to the attached drawings.

BRIEF DESCRIPTION OF THE DRAWINGS

FIGS. 6A and 6B show a structure of a cross-section taken along the line H-H in a J portion of FIG. 5, in which FIG. 6A shows a state before a toner frame 11 is connected to a developing frame 12, and FIG. 6B shows a state after the toner frame 11 is connected to the developing frame 12.

FIGS. 7A, 7B, 7C, 7D and 7E are cross-sectional views illustrating a procedure of engaging a sealing handle of the process cartridge to the toner frame according to the embodiment of the present invention, in which FIG. 7A shows a stage of a procedure 1, FIG. 7B shows a stage of a procedure 2, FIG. 7C shows a stage of a procedure 3, FIG. 7D shows a stage after the procedures 1-3, and FIG. 7E is an enlarged view of FIG. 7D.

DESCRIPTION OF THE EMBODIMENTS (Molded Resin Complex and Production Method Thereof)
In the molded resin complex of the present invention, a first resin molded product and a second resin molded product are engaged with each other so as to be separable. As the first resin molded product, one pervious to laser light is selected, and as the second resin molded product, one absorptive to laser light is selected. Then, the first resin molded product and the second resin molded product are placed close to each other or in contact with each other, and laser light is applied from the first resin molded product side. Thus, a portion of the second resin molded product irradiated with laser light is melted by heating or thermally expanded to form a protrusion (s), and the first resin molded product and the second resin molded product are engaged with each other so as to be separable owing to the protrusion(s).

Figure 1A:
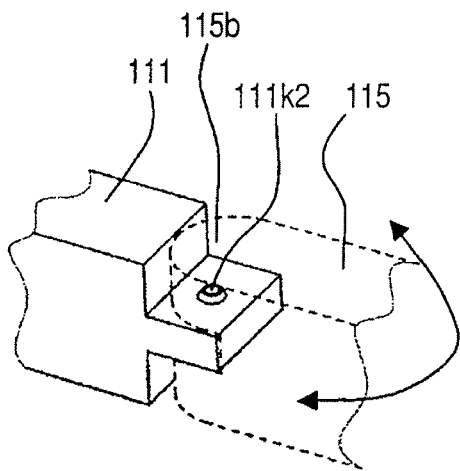
FIG. 1A is a perspective view showing a schematic configuration of a molded resin complex according to an embodiment of the present invention.

FIG. 1A shows an example of the molded resin complex. In the molded resin complex of FIG. 1A, a first resin molded product 115 and a second resin molded product 111 are engaged with each other so as to be separable by an engagement portion 111k2. The first resin molded product 115 is pervious to laser light, and the second resin molded product 111 is absorptive to laser light. Then, a laser irradiation portion 115b of the surface of the first resin molded product is irradiated with laser light, whereby the engagement portion 111k2 is formed.

If the first resin molded product and the second resin molded product may be placed so that at least parts of the two are close to or in contact with each other, it is sufficient to achieve the objective. For example, one resin molded product can be placed on one surface of the other resin molded product. In addition, they can also be placed so that one resin molded product is fitted with the other resin molded product. Further, both of the resin molded products can also be placed so that they are fitted with each other.

In the molded resin complex of FIG. 1A, the second resin molded product 111 is fitted in the first resin molded product 115. By placing them in such a manner and irradiating the laser irradiation portion 115b of the first resin molded product 115 with laser light to form the engagement portion 111k2 on the second resin molded product 111, both of the resin molded products can turn in the direction indicated by an arrow around the engagement portion 111k2. The molded resin complex can separate easily by pulling the first resin molded product 115 and the second resin molded product 111 in the shearing direction of the engagement portion 111k2.

In the case where the first resin molded product and the second resin molded product are placed close to each other, the interval therebetween is preferably 0.3 mm or less. With such an arrangement, when the laser irradiation portion of the second resin molded product is melted by heating or thermally expanded, the interval can easily be filled, and the engagement portion can easily be formed. Similar effects are obtained even when the first resin molded product and the second resin molded product are placed in contact with each other.

As the laser light to be used, laser light with a wavelength of 800 to 1200 nm in an infrared light region is preferably used from the viewpoint of melting the second resin molded product 111 by heating. For example, a semiconductor laser with a wavelength of 960 nm can be used.

As the first resin from which the first resin molded product is formed, a resin pervious to laser light can appropriately be used. For example, polyethylene (PE), polypropylene (PP), polycarbonate (PC), polyoxymethylene (POM), polyamide (PA), polybutylene terephthalate (PBT), polyphenylene sulfide (PPS), etc. can be used. Among them, polypropylene (PP) is preferable because its hinge characteristics (repeating properties) are desirable. The first resin may contain a colorant transmitting laser light. It is preferable that the first resin molded product has a thickness of 0.5 to 2.5 mm.

The resin pervious to laser light refers to a resin with a transmittance of 20% or more when irradiated with laser light.

As the second resin from which the second resin molded product is formed, a resin absorptive to laser light can appropriately be used. For example, polystyrene (PS), high-impact polystyrene (HIPS), an acrylonitrile-butadiene-styrene copolymer (ABS), etc. can be used. Among them, high-impact polystyrene (HIPS) is preferable due to its high shock resistance. The second resin may contain a flame retardant and so forth. It is preferable that the second resin molded product has a thickness of 0.8 to 2.5 mm.

The resin absorptive to laser light refers to the resin having a transmittance of 5% or less when irradiated with laser light.

Figure 1B:
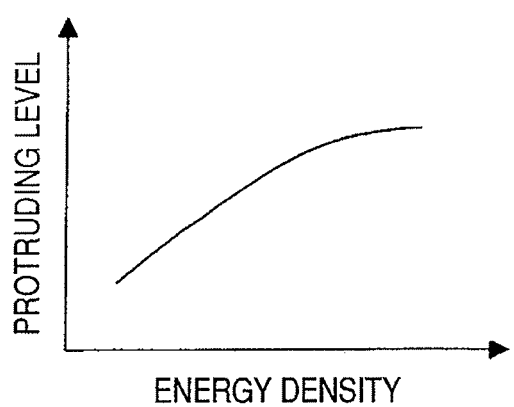
FIG. 1B is a graph showing a tendency of a relationship between an energy density of laser light to be applied and a protruding level of a protrusion.

The size of the protrusion(s) formed on the second resin molded product can be appropriately set so as to exhibit desired engagement force and separability. The diameter of the protrusion can be adjusted by a spot diameter of laser light. The height of the protrusion can be adjusted by the energy density of laser light to be applied. Since the energy density of laser light to be applied and the protrusion level of the protrusion have such a tendency as shown in FIG. 1B, the size of the protrusion can be adjusted by previously preparing a graph. For example, a protrusion with a diameter of 0.5 to 3 mm and a height of 0.05 to 0.3 mm can be formed.

The irradiation conditions for laser light can be set by appropriately setting conditions enabling a desired protrusion to be formed on the second resin molded product. For example, the energy density of laser light can be set to be 0.05 to 1.2 $J/mm^2$ and the output of laser light can be set to be 5 to 20 W.

The first resin molded product and the second resin molded product may have low compatibility. More specifically, when the first resin molded product and the second resin molded product have low compatibility, they are generally difficult to engage in such a manner that they are separable. However, according to the procedure(s) of the present invention, they can be engaged so as to be separable. Herein, the "low compatibility" refers to a state that a difference in solubility parameter (SP value) between the first resin and the second resin is 0.2 or more. The SP value refers to a square root of the cohesive energy density of molecules and represents the magnitude of the cohesion force between molecules (intermolecular force). The SP values of the resins used in the present invention were calculated by means of the Small's formula.

Further, it is preferable that the first resin has a molding temperature lower than that of the second resin. Thus, a portion of the first resin molded product coming into contact with the protrusion formed on the second resin molded product is thermally melted, whereby the first and second resin molded products are more strongly engaged with each other. For example, as the first resin, a resin having a molding temperature of 180° C. to 190° C. is selected, and as the second resin, a resin having a molding temperature of 200° C. to 250° C. is selected. Since the molding temperature is generally set to be a melting temperature or more, it is preferable that the first resin has a melting temperature lower than that of the second resin. For example, as the first resin, a resin having a melting temperature of 180° C. to 190° C. is selected, and as the second resin, a resin having a melting temperature of 200° C. to 210° C. is selected.

It is preferable that the engagement portion of the molded resin complex to be obtained can be separated by applying a force of 1 to 5 N in a direction perpendicular to the protrusion. This force can determine the area, depth, and so forth of the engagement portion freely to some degree by adjusting the energy density and range of laser light.

The above-mentioned molded resin complex can be used for, for example, a cartridge to be mounted on an electrophotographic image forming apparatus.

(Cartridge and Production Method Thereof)

The cartridge of the present invention can be attached/detached to an electrophotographic image forming apparatus. An example of the cartridge of the present invention includes a process cartridge in which an image bearing member is integrated with process means acting on the image bearing member. As the process means, a charging means for charging the surface of the image bearing member, a developing device for forming a toner image on the image bearing member, a cleaning means for cleaning toner remaining on the surface of the image bearing member, and so forth may be provided.

The cartridge of the present invention has a molded resin complex in which a first resin molded product is engaged with a second resin molded product such that they are separable, and as the molded resin complex, the above-mentioned molded resin complex is used. As a preferable embodiment thereof, a process cartridge may be cited having a developer containing frame, formed of the second resin molded product, for containing a developer, and a handle, formed of the first resin molded product, for pulling out a sealing member sealing an opening for supplying a developer of the developer containing frame. It should be noted that the cartridge of the present invention is not limited to the process cartridge, and can also be applied to a system (toner cartridge) supplying only a developer (toner) to the image forming apparatus.

Figure 2:
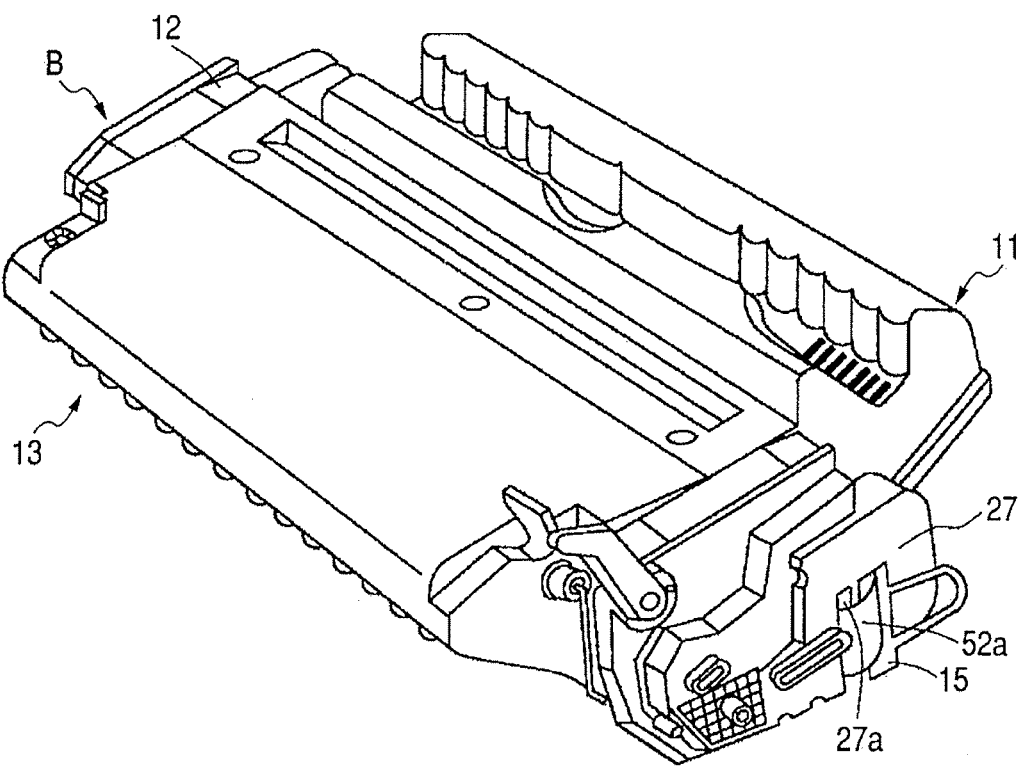
FIG. 2 is a perspective view showing a schematic structure of a process cartridge according to an embodiment of the present invention.
Figure 3:
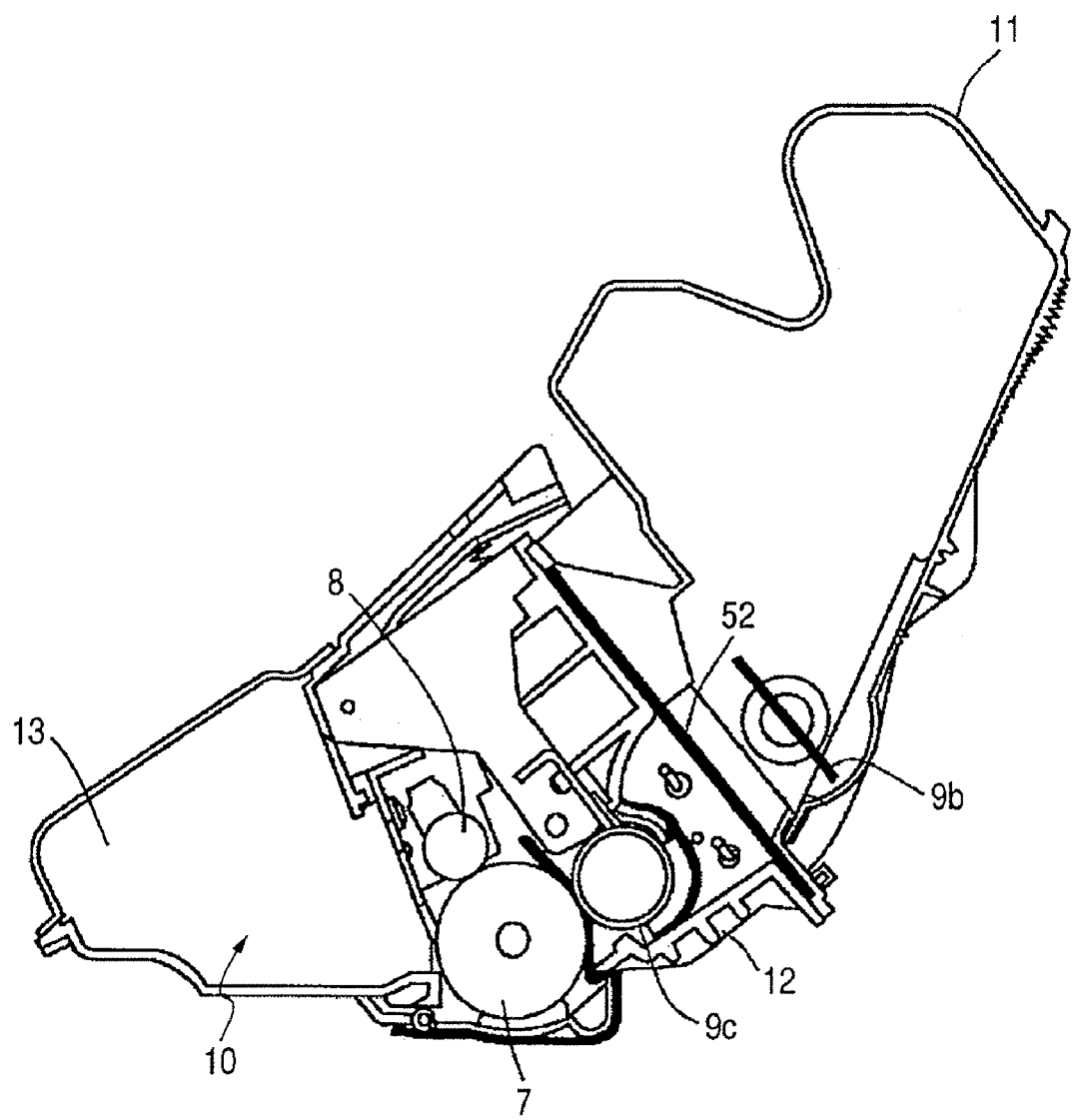
FIG. 3 is a cross-sectional view showing a schematic structure of the process cartridge according to an embodiment of the present invention.
Figure 4:
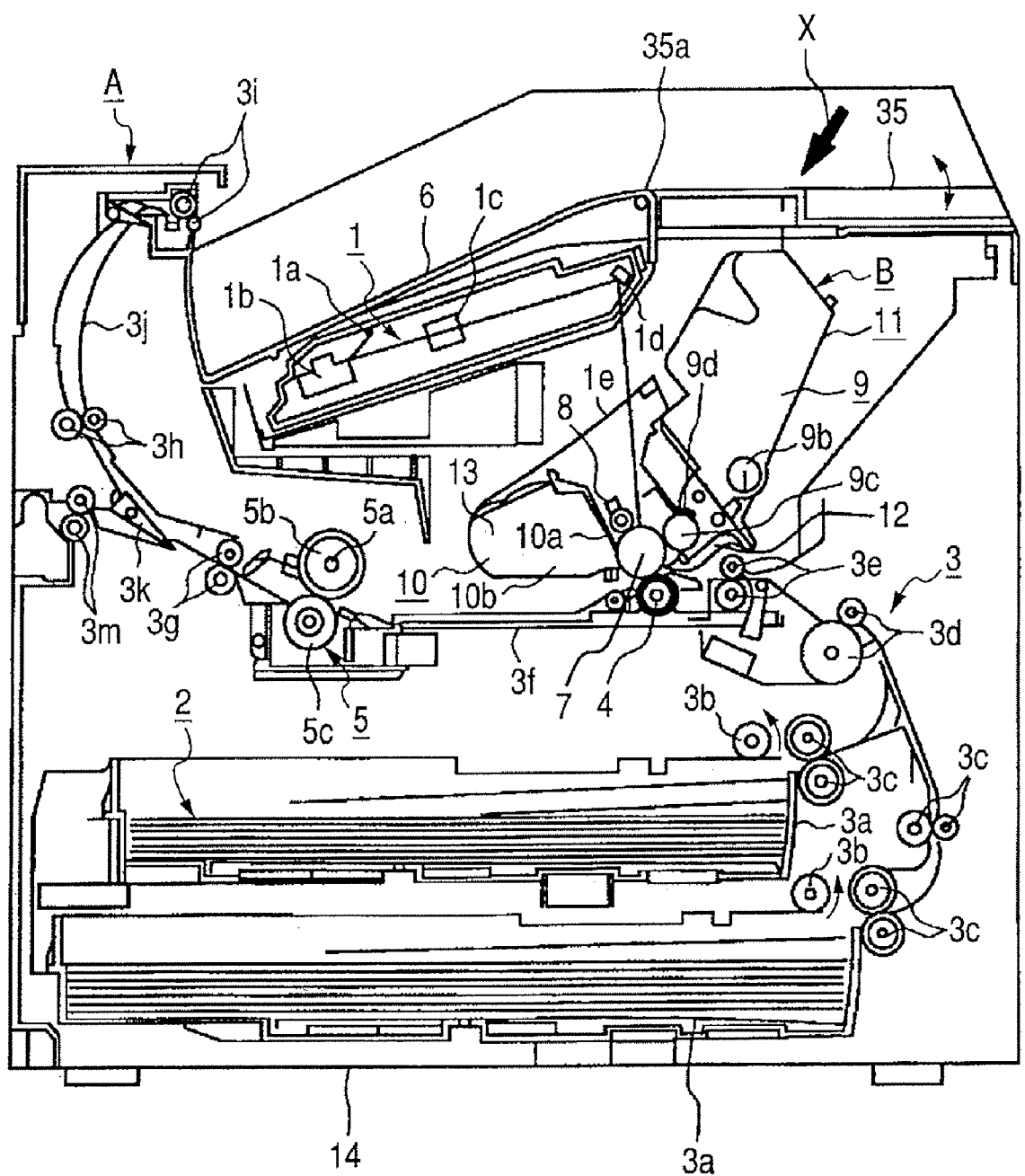
FIG. 4 is a cross-sectional view of an electrophotographic image forming apparatus with the process cartridge according to an embodiment of the present invention mounted thereon.

Hereinafter, the process cartridge as the embodiment of the present invention will be described with reference to the drawings. FIG. 2 is a perspective view showing a schematic configuration of the process cartridge according to the present invention. FIG. 3 is a cross-sectional view showing a schematic configuration of the process cartridge according to the present invention. FIG. 4 is a cross-sectional view of a laser beam printer (hereinafter, referred to as an image forming apparatus) that is an electrophotographic image forming apparatus according to the present invention.

(Configuration of Image Forming Apparatus with Process Cartridge Mounted Thereon)

As shown in FIG. 4, in an image forming apparatus A, a laser light image based on image information is applied from an optical system 1, whereby a latent image is formed on a photosensitive drum 7 that is an image carrying member charged previously by a charging means 8. The optical system 1 is composed of a laser diode 1a, a polygon mirror 1b, a lens 1c, and a reflective mirror 1d. The above-mentioned latent image is developed with a developer (hereinafter, referred to as toner) supplied from a developing roller 9c of a developing means 9, whereby a toner image is formed. On the other hand, in synchronization with the formation of the toner image, a recording material 2 is transported from a feed cassette 3a by transport means 3 composed of a pickup roller 3b, a feed roller pair (transport roller pair) 3c, a transport roller pair 3d, a resist roller pair 3e, and so forth. A toner image formed on the photosensitive drum 7 is transferred to the recording target material 2 by applying a voltage to a transfer roller 4 as transfer means. The recording material 2 with the toner image transferred thereon is guided by a guide plate (transport guide) 3f to be transported to a fixing means 5.

The fixing means 5 is composed of a driving roller 5c, and a fixing roller 5b containing a heater 5a, and applies heat and pressure to the recording material 2 (recording medium) passing through the fixing means 5, thereby fixing the toner image on the recording target material 2. The recording target material 2 with the toner image fixed thereon is transported by discharge roller pairs 3g, 3h, and 3i, and discharged to a discharge portion (discharge tray) 6 through an inversion transport path 3j. The image forming apparatus A can discharge paper also to an image forming apparatus body 14 side by means of a flapper 3k and a discharge roller pair 3m.

(Configuration of Process Cartridge)

A process cartridge B includes an image carrying member 7 and process means acting on the image carrying member 7. The process means includes charging means 8 for charging the surface of the image carrying member 7, a developing device 9 for forming a toner image on the image carrying member 7, and a cleaning means 10 for removing toner remaining on the surface of the image carrying member 7.

In the process cartridge B, the photosensitive drum 7, which is an image carrying member, rotates, and the surface thereof is uniformly charged by charging means (charging roller) 8. The photosensitive drum 7 is exposed to an optical image from the optical system 1 through an exposure opening 14, whereby a latent image is formed on the photosensitive drum 7. Then, a toner image in accordance with the latent image is formed to be visualized on the photosensitive drum 7 with the uniform toner layer formed on a developing roller 9c by means of a toner feed member 9b and a developing blade 9d (a toner regulating member) the developing means 9 has. After the toner image is transferred to the recording material 2 by the transfer roller 4, the toner remaining on the photosensitive drum 7 is removed by the cleaning means 10.

The cleaning means 10 scrapes off the toner remaining on the photosensitive drum 7 with an elastic cleaning blade 10a placed so as to be in contact with the photosensitive drum 7, and stores the toner in a waste toner storing container 10b.

The process cartridge B is composed of a toner frame (developer containing frame) 11 having a toner storing container, etc., a developing frame 12 having the developing roller 9c, etc. and a cleaning frame 13 having the photosensitive drum 7, the cleaning means 10, etc.

(Mounting of Process Cartridge)

On both sides in the longitudinal direction of the process cartridge B viewed from the mounting direction X of the process cartridge B shown in FIG. 3, a positioning guide (not shown) and a posture determining guide (not shown) behind the positioning guide are provided. On the other hand, on the upper surface of the apparatus body 14, an open/close cover 35 mounted pivotally with a hinge 35a is adapted so as to be opened upward. When the open/close cover 35 is opened, guide members (not shown) having guide rails are set on right and left walls inside the image forming apparatus body 14. By inserting the positioning guide and posture determining guide of the process cartridge B in the guide rails, the process cartridge B is inserted in a predetermined position in the apparatus body 14. The process cartridge B is taken out by the reverse procedures.

(Sealing Handle Provided to Process Cartridge)

In the above-mentioned process cartridge, the developing means 9 is configured so as to be separated into two parts: the developing frame 12 supporting the developing roller 9c, the developing blade 9d, etc., and the toner frame 11 containing toner.

Figure 5:
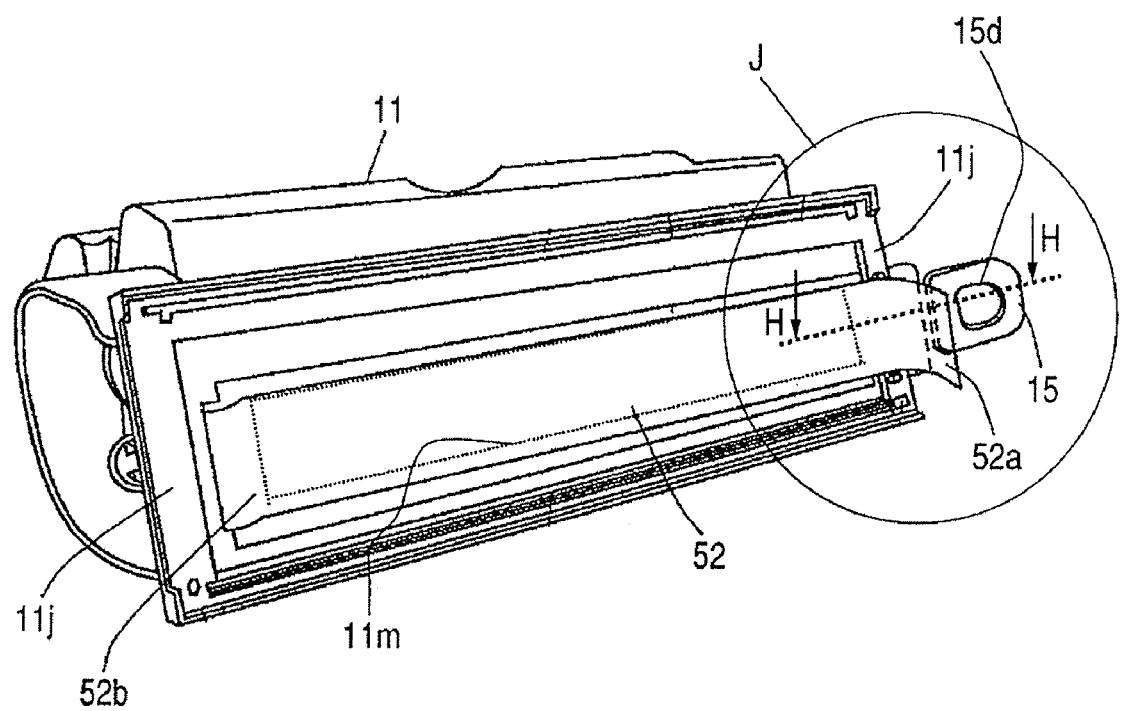
FIG. 5 is a perspective view showing a toner frame of the process cartridge according to an embodiment of the present invention.
Figure 6A:
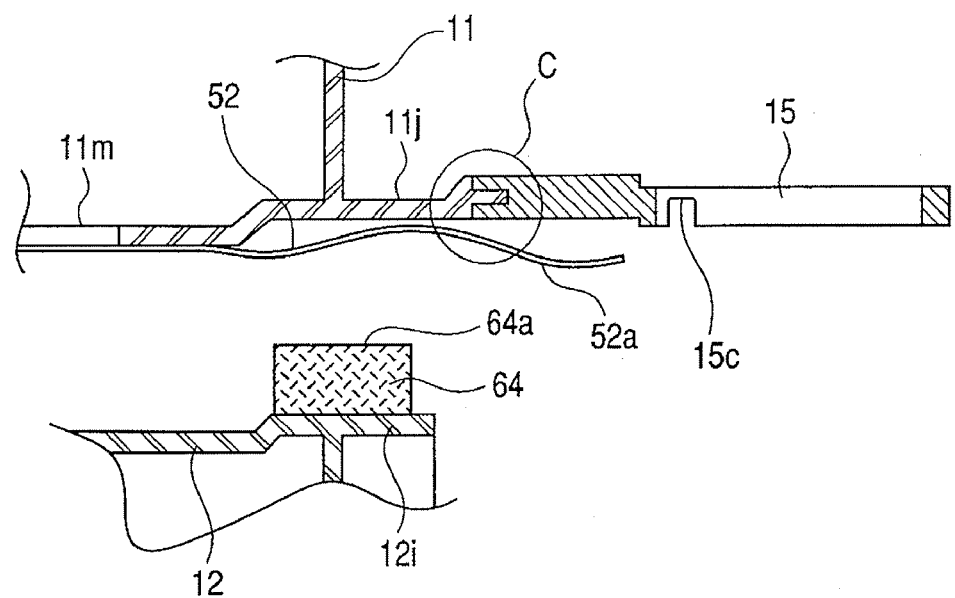
Figure 6B:
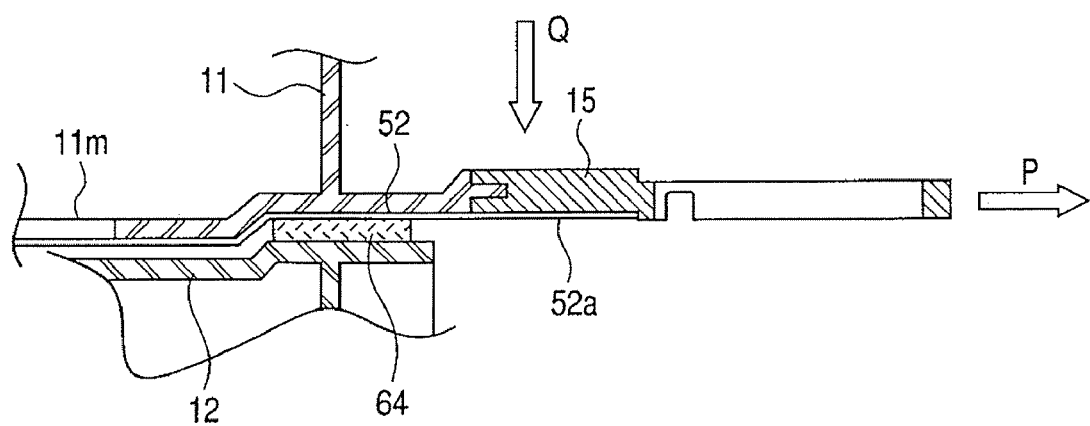

For the purpose of connecting the developing frame 12 to the toner frame 11, to upper and lower portions in the opening longitudinal direction of any one of the developing frame 12 and the toner frame 11, respectively, a welding rib and a welding rib (not shown) are provided substantially in parallel with each other. A thread protruding from the root of the welding rib is fitted in a race (not shown) of the toner frame 11, and the frames are connected and fixed to each other by ultrasonic welding. Further, as shown in FIGS. 6A and 6B that are cross sectional views taken along the line H-H of the J portion in FIG. 5 showing the configuration of the toner frame 11 on the developing frame side, a band-shaped sponge 64 is fixed to each end 12i in the longitudinal direction of the developing frame 12 with a double-sided adhesive tape or the like. A contact surface 64a of the sponge 64 comes into contact with each end 11j in the longitudinal direction of the toner frame 11, and the developing frame 12 and the toner frame 11 come into close contact with each other in a container shape due to the elasticity, whereby toner is prevented from leaking through the side of the developing means 9.

On the other hand, in the case of a brand-new process cartridge, on the surface of the toner frame 11 connected to the developing frame 12, a sealing member 52 (toner seal) for preventing the toner in the toner frame 11 from entering the developing frame 12 is fixed by welding in a heat seal system. A user pulls off the sealing member 52, and then mounts the process cartridge in the apparatus body 14.

The sealing member 52 is attached to the peripheral edge of an opening 11m of the toner frame 11, and is folded and superposed at one end 52b in the longitudinal direction. The other end 52a in the longitudinal direction passes between the sponge 64 fixed to the developing frame 12 and the toner frame 11, and further passes through a developing unit side cover 27 and through a seal draw opening 27a of the developing unit side cover 27 to be drawn outside (see FIG. 2).

One end 52a in the longitudinal direction of the sealing member 52 is fixed to the handle 15 that is a seal draw member integrated with the toner frame 11 by means of an adhesive (not shown) such as a double-sided adhesive tape. When mounting the process cartridge B on an electrophotographic image forming apparatus for the first time after purchasing it, a user holds the handle 15 to draw the sealing member 52 as a member to be removed, thereby unsealing the toner frame 11 to enable the developing frame 12 to be supplied.

The handle 15 has a ring shape and is provided with a hole 15d for inserting a finger so that a user can easily draw the sealing member 52.

(Engagement of Sealing Handle and Toner Frame)

The sealing handle 15 and the toner frame 11 are engaged with each other so as to be separable. The procedure of the engagement is as follows. The sealing handle 15 is made of a first resin pervious to laser light, and the toner frame 11 is made of a second resin absorptive to laser light.

Procedure 1: As shown in FIG. 7A, a protruded portion 11k formed at the end 11j in the longitudinal direction of the toner frame 11 and a depressed portion 15a formed in the sealing handle 15 are fitted with each other in the direction indicated by the arrow.

Procedure 2: As shown in FIG. 7B, a laser light irradiation surface 11k1 of the protruded portion 11k in the toner frame 11 and an inner surface 15a1 of the depressed portion 15a in the sealing handle 15 are brought close to or into contact with each other. In the case of bringing them close to each other, an interval K therebetween is preferably 0.3 mm or less.

Procedure 3: As shown in FIG. 7C, the depressed portion 11k of the toner frame 11 and the protruded portion 15a of the sealing handle 15 in the fitted state are irradiated with laser light m from an outer surface 15b side of the sealing handle 15, and a laser head n is moved in the depth direction of the figure.

As described above, when the laser light is applied from the outer surface 15b side of the sealing handle 15, the laser light passes through the sealing handle 15 pervious to laser light and reaches the laser light irradiation surface 11k1 of the toner frame 11. The toner frame 11 absorbs laser light and converts it into heat energy. Thus, the laser light irradiation portion is melted by heating or thermally expanded to form a protrusion (s) 11k2, thereby filling the interval K. Further, the inner surface 15a1 of the sealing handle 15 in contact with the protrusion(s) 11k2 is(are) also melted with heat transmitted from the protrusion 11k2, and engagement is formed as shown in FIGS. 7D and 7E that is an enlarged view of FIG. 7D.

The above-mentioned engagement can separate from the toner frame 11 when the sealing handle 15 is pulled in the direction indicated by the arrow P shown in FIG. 6B, and can resist separating when pulled in the direction of the arrow Q. More specifically, the sealing handle 15 is prevented from coming off easily due to vibrations and shocks during transportation or the like.

It is preferable that the molding temperature of the material for the sealing handle 15 is lower than the molding temperature lower of the material for the toner frame 11. Thereby, the inner surface 15a1 of the sealing handle 15 can easily be melted with heat transmitted from the protrusion 11k2, whereby the engagement can easily be formed. More specifically, although the heat of the protrusion 11k2 diffuses into the periphery and the heat amount is reduced with the passage of time, the engagement can be formed.

In this embodiment, as the material for the toner frame 11, high-impact polystyrene (HIPS) (molding temperature: 210° C.) is adopted, and as the material for the sealing handle 15, polypropylene (PP) (molding temperature: 190° C.) is adopted.

The height of the protrusion 11k2 in the toner frame 11 and the energy density of laser light to be applied have such a relationship as shown in the graph of FIG. 1B. In this embodiment, when the energy density of laser light to be applied is 0.33 J/mm$^2$, the protrusion amount L (see FIG. 7E) was 0.22 mm. Further, the force in the P direction shown in FIG. 6B, which is drawing force in that case, was 5.5 N. The drawing force can determine the area, depth, and so forth of the engagement portion to some degree by adjusting the energy density and range of laser light.

(Laser Light)

The wavelength of laser light is not particularly limited as long as it is infrared light (800 to 1200 nm). In this embodiment, a laser welding apparatus (trade name: FD200; Wavelength: 960 nm) produced by Fine Device Co., Ltd. was used. Further, it is preferable that the energy density of the laser light irradiation portion is 0.05 to 1.2 J/mm$^2$. In this embodiment, since the speed, output, and spot diameter were set to be 50 mm/sec., 20 W, and φ1.2 mm, respectively, the energy density was 0.33 J/mm$^2$.

(Material for Sealing Handle)

In this embodiment, as a material for the sealing handle, polypropylene (PP) colored with a colorant, which transmits laser light, is used. The SP value of polypropylene (PP) was 17.4. The reasons for selecting this material are as follows: (1) hinge characteristics (repeating property) are satisfactory, and (2) the process cartridge can be folded at a thin portion 15c formed in the sealing handle 15 when packed for shipping, transportation, or the like. More specifically, as shown in FIG. 6A, by forming the thin portion 15c in the short direction of the sealing handle 15 so that the sealing handle 15 can be folded at the thin portion 15c, a packing member can be reduced in size without impairing the easiness of drawing the sealing handle 15. The transmittance of laser light of the sealing handle was 40%.

(Material for Toner Frame)

As an example of the material that can be used preferably for a cartridge frame including a toner frame, high-impact polystyrene (HIPS) may be cited which is a modified rubber styrene-type material. The high-impact polystyrene is obtained by mixing a rubber polymer or a rubber copolymer with inexpensive polystyrene (PS) with satisfactory flowability so as to enhance shock resistance. As the rubber polymer or rubber copolymer, it is possible to preferably use polybutadiene, a styrene-butadiene copolymer, polyisoprene, a butadiene-isoprene copolymer, natural rubber, an ethylene-propylene copolymer, etc.

Further, the above-mentioned material is often required to have flame retardance in the V2 rank of UL-94 for the safety with respect to fire. Therefore, as a flame retardant, a bromine-type flame retardant or a phosphate-type flame retardant is added. Examples of the bromine-type flame retardant include ethylene bis(pentabromobenzene), a tetrabromobisphenol A derivative, and a polybromo aliphatic ether derivative. Examples of the phosphate-type flame retardant include resorcinol bis(diphenylphosphate), and bisphenol A bis(diphenylphosphate).

Further, by adding a second flame retardant, the adding amount of the above-mentioned flame retardant can be reduced, and the heat resistance of a base polymer can also be prevented from decreasing. In the case of using a bromine-type flame retardant as a flame retardant, it is preferable to use antimony trioxide as the second flame retardant, because the effect is large.

In this embodiment, a cartridge frame was used as a laser light absorber, hence the cartridge frame was formed of a resin composition with the following composition. That is, a resin composition was used which was obtained by adding 0.7 parts by mass of colorant (carbon black with a number average particle diameter of 16 nm), 8 parts by mass of rubber (number-average particle diameter: 1.8 μm), and a flame retardant (phosphate-type) to 100 parts by mass of a styrene-type resin (weight-average molecular weight: 220000). The SP value of the styrene-type resin was 18.3. The rubber was polybutadiene rubber, and the flame retardant was an aromatic condensation type phosphate ester, and the adding amount thereof is 8 parts by mass. The laser light transmittance of the frame molded into a plate having a thickness of 2 mm by the use of the resin composition was 0.5%.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-374587, filed Dec. 27, 2005, which is hereby incorporated by reference herein in its entirety.

What is claimed is:

1. A cartridge mounted on an electrophotographic image forming apparatus, comprising a molded resin complex in which a first resin molded product and a second resin molded product are engaged with each other so as to be separable, wherein:

the first resin molded product is obtained by molding a first resin pervious to laser light;

the second resin molded product is obtained by molding a second resin absorptive to laser light; and the first resin molded product and the second resin molded product are engaged with each other so as to be separable, by one or more protrusions of the second resin molded product which is formed by applying laser light from the first resin molded product side while placing the first resin molded product and the second resin molded product either in a close state or in a contact state, and further comprising a developer containing frame containing a developer and a handle for drawing out a sealing member sealing a developer supplying opening of the developer containing frame, wherein the first resin molded product is the handle, and the second resin molded product is the developer containing frame.

2. A cartridge according to claim 1, wherein a difference in SP value between the first resin and the second resin is 0.2 or more.

3. A cartridge according to claim 1, wherein one of the first resin molded product and the second resin molded product comprising the molded resin complex is fitted with the other.

4. A cartridge according to claim 1, wherein the first resin molded product and the second resin molded product are either in a state that they are close to each other at an interval of 0.3 mm or less or in a state that they are in contact with each other.

5. A cartridge according to claim 1, wherein a molding temperature of the first resin is lower than a molding temperature of the second resin.

* * * * *